US009132553B2

(12) United States Patent
Yasuda et al.

(10) Patent No.: US 9,132,553 B2
(45) Date of Patent: Sep. 15, 2015

(54) ROBOT SYSTEM AND METHOD FOR PRODUCING A TO-BE-PROCESSED MATERIAL

(71) Applicant: Kabushiki Kaisha Yaskawa Denki, Kitakyushu (JP)

(72) Inventors: Yuya Yasuda, Kitakyushu (JP); Kazuhiko Fukushima, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 124 days.

(21) Appl. No.: 13/644,307

(22) Filed: Oct. 4, 2012

(65) Prior Publication Data
US 2013/0085605 A1   Apr. 4, 2013

(30) Foreign Application Priority Data
Oct. 4, 2011   (JP) .................. 2011-220317

(51) Int. Cl.
*B25J 9/16*   (2006.01)
*G05B 19/04*   (2006.01)
*G05B 19/18*   (2006.01)
(Continued)

(52) U.S. Cl.
CPC .............. *B25J 9/1697* (2013.01); *B25J 9/1687* (2013.01); *G05B 2219/39508* (2013.01); *G05B 2219/39567* (2013.01); *G05B 2219/40053* (2013.01); *G05B 2219/40613* (2013.01); *G05B 2219/45063* (2013.01)

(58) Field of Classification Search
CPC ...... B25J 9/1687; B25J 9/1697; B25J 9/1666; G05B 2219/39508; G05B 2219/45063; G05B 2219/40053; G05B 2219/40613; G05B 2219/39567; G05B 2219/40038; G05B 2219/37555; G05B 2219/49271; G05B 2219/39566; G05B 2219/39558; G05B 19/4061; G05B 2219/40087; G05B 2219/40559; G05B 2219/40476; G05B 2219/40497; G05B 2219/40317; G06T 7/0042; G06T 7/0004; G06T 2207/30164
See application file for complete search history.

(56) References Cited

U.S. PATENT DOCUMENTS 3,891,098 A * 6/1975 Koch .......................... 414/796.4
4,155,193 A * 5/1979 MacDonald .................... 43/67
5,311,700 A * 5/1994 Thomas ........................ 47/76
(Continued)

FOREIGN PATENT DOCUMENTS

CN   1542426    11/2004
CN   102189551   9/2011
(Continued)

OTHER PUBLICATIONS

Japanese Office Action for corresponding JP Application No. 2011-220317, Sep. 3, 2013.
(Continued)

*Primary Examiner* — Bao Long T Nguyen
(74) *Attorney, Agent, or Firm* — Mori & Ward, LLP

(57) ABSTRACT

A robot system includes a container, a disposed-state detector, and a robot arm. The container is configured to accommodate a plurality of to-be-held objects and includes a reticulated portion. The disposed-state detector is configured to detect disposed states of the plurality of respective to-be-held objects disposed in the container. The robot arm includes a holder configured to hold a to-be-held object among the plurality of to-be-held objects based on the disposed states of the plurality of respective to-be-held objects detected by the disposed-state detector.

18 Claims, 13 Drawing Sheets

(51) Int. Cl.
    *G05B 15/00* (2006.01)
    *G05B 19/00* (2006.01)

(56) References Cited

U.S. PATENT DOCUMENTS

| | | | |
|---|---|---|---|
| 6,176,175 B1* | 1/2001 | Moreth | 99/408 |
| 6,350,608 B1* | 2/2002 | Teran et al. | 435/267 |
| 6,430,474 B1* | 8/2002 | DiStasio et al. | 700/245 |
| 6,597,971 B2* | 7/2003 | Kanno | 700/245 |
| 7,474,939 B2* | 1/2009 | Oda et al. | 700/245 |
| 2004/0212795 A1 | 10/2004 | Steinbichler et al. | |
| 2008/0082213 A1* | 4/2008 | Ban et al. | 700/260 |
| 2008/0208389 A1* | 8/2008 | Checketts | 700/214 |
| 2009/0101049 A1* | 4/2009 | Lee | 108/57.32 |
| 2009/0257860 A1* | 10/2009 | Schafer | 414/795.4 |
| 2011/0098859 A1 | 4/2011 | Irie et al. | |
| 2011/0222995 A1* | 9/2011 | Irie et al. | 414/225.01 |
| 2011/0301741 A1* | 12/2011 | Kayani et al. | 700/114 |

FOREIGN PATENT DOCUMENTS

| | | |
|---|---|---|
| DE | 102008025857 | 3/2009 |
| DE | 102008052436 | 4/2010 |
| DE | 102008052440 | 4/2010 |
| EP | 2364823 | 9/2011 |
| JP | 11-123681 | 5/1999 |
| JP | 2001-300878 | 10/2001 |
| JP | 2011-115930 | 6/2011 |
| WO | WO 2011/031523 | 3/2011 |

OTHER PUBLICATIONS

Extended European Search Report for corresponding EP Application No. 12186276.7-1807, May 6, 2013.
Chinese Office Action for corresponding CN Application No. 201210367981.4, Jul. 1, 2014.
Chinese Office Action for corresponding CN Application No. 201210367981.4, Mar. 2, 2015.

* cited by examiner

ROBOT SYSTEM AND METHOD FOR PRODUCING A TO-BE-PROCESSED MATERIAL

CROSS-REFERENCE TO RELATED APPLICATIONS

The present application claims priority under 35 U.S.C. §119 to Japanese Patent Application No. 2011-220317, filed Oct. 4, 2011. The contents of this application are incorporated herein by reference in their entirety.

BACKGROUND OF THE INVENTION

1. Field of the Invention

The present invention relates to a robot system and a method for producing a to-be-processed material.

2. Discussion of the Background

As conventionally known, some robot systems include robot arms provided with holders to hold to-be-held objects (see, for example, Japanese Unexamined Patent Application Publication No. 2011-115930).

Japanese Unexamined Patent Application Publication No. 2011-115930 discloses a robot system including a robot arm and a sensor unit. The robot arm includes a gripper (holder) to hold a workpiece (to-be-held object). The sensor unit detects (picks up an image of) a plurality of workpieces disposed in a box-shaped stocker having planar side surfaces and a planar bottom surface. In the robot system recited in Japanese Unexamined Patent Application Publication No. 2011-115930, the sensor unit picks up an image of the plurality of workpieces disposed in the stocker so as to detect a disposed state of each of the plurality of workpieces. Then, the robot arm is driven to have its gripper grip one workpiece selected from the plurality of workpieces.

SUMMARY OF THE INVENTION

According to one aspect of the present invention, a robot system includes a container, a disposed-state detector, and a robot arm. The container is configured to accommodate a plurality of to-be-held objects and includes a reticulated portion. The disposed-state detector is configured to detect disposed states of the plurality of respective to-be-held objects disposed in the container. The robot arm includes a holder configured to hold a to-be-held object among the plurality of to-be-held objects based on the disposed states of the plurality of respective to-be-held objects detected by the disposed-state detector.

According to another aspect of the present invention, a method for producing a to-be-processed material includes detecting, using a disposed-state detector, disposed states of a plurality of to-be-processed materials disposed in a container including a reticulated portion. A to-be-processed material among the plurality of to-be-processed materials is held using a holder of a robot arm based on the disposed states of the plurality of respective to-be-processed materials detected by the disposed-state detector. The to-be-processed material is transferred to a next process. The to-be-processed material is subjected to predetermined processing in the next process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
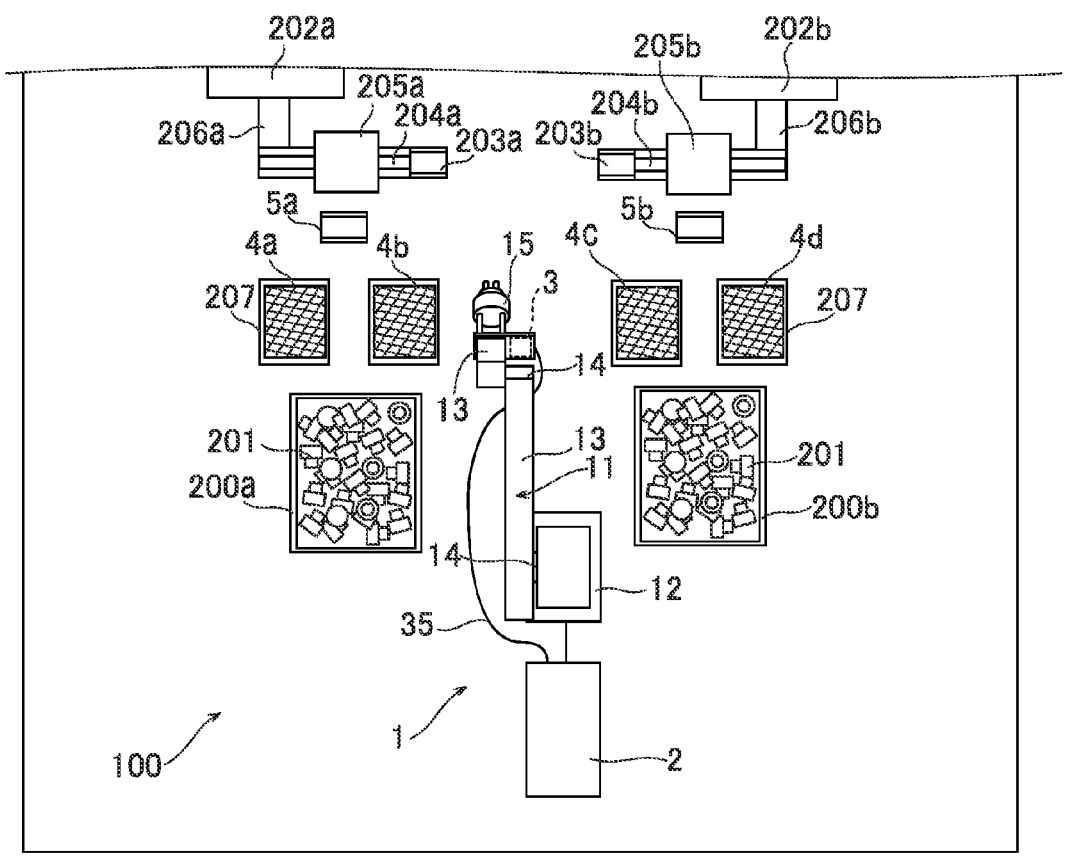
FIG. 1 is a plan view of the entire robot system according to an embodiment.

The embodiments will now be described with reference to the accompanying drawings, wherein like reference numerals designate corresponding or identical elements throughout the various drawings.

First, referring to FIGS. 1 to 9, a robot system 100 according to an embodiment will be described.

As shown in FIG. 1, the robot system 100 includes a robot 1, a robot controller 2, a disposed-state detector 3, four temporary placement portions 4a, 4b, 4c, and 4d, and re-holding tables 5a and 5b. The robot controller 2 controls overall operation of the robot system 100. The four temporary placement portions 4a, 4b, 4c, and 4d are where workpieces 201 are temporarily placed. The re-holding tables 5a and 5b are where workpieces 201 are re-held. Adjacent the robot system 100, two workpiece palettes 200a and 200b are disposed to accommodate a plurality of workpieces 201. The two temporary placement portions 4a and 4b are dedicated to the workpiece palette 200a, while the other two temporary placement portions 4c and 4d are dedicated to the workpiece palette 200b. The robot controller 2 corresponds to the "controller" recited in the accompanying claims. The temporary placement portions 4a, 4b, 4c, and 4d each correspond to the "container" recited in the accompanying claims. The re-holding tables 5a and 5b each correspond to the "table" recited in the accompanying claims. The workpiece 201 corresponds to the "to-be-held object" and the "to-be-processed material" recited in the accompanying claims. The workpiece palettes 200a and 200b each correspond to the "storage portion" recited in the accompanying claims.

Adjacent the robot system 100, two machines 202a and 202b (examples including, but not limited to, processors) in charge of the next process are disposed. Between the robot system 100 and the machine 202a (machine 202b) in charge of the next process, a track 204a (track 204b) is disposed. On the track 204a (track 204b), a workpiece receiver 203a (workpiece receiver 203b) is disposed to transfer a workpiece 201 to the machine 202a (machine 202b) in charge of the next process. The track 204a (track 204b) is surrounded by a demagnetizer 205a (demagnetizer 205b) to demagnetize the workpiece 201. Between the track 204a (track 204b) and the machine 202a (machine 202b) in charge of the next process, a workpiece introducer 206a (workpiece introducer 206b) is disposed to introduce the workpiece 201 into the machine 202a (machine 202b) in charge of the next process.

Figure 4:
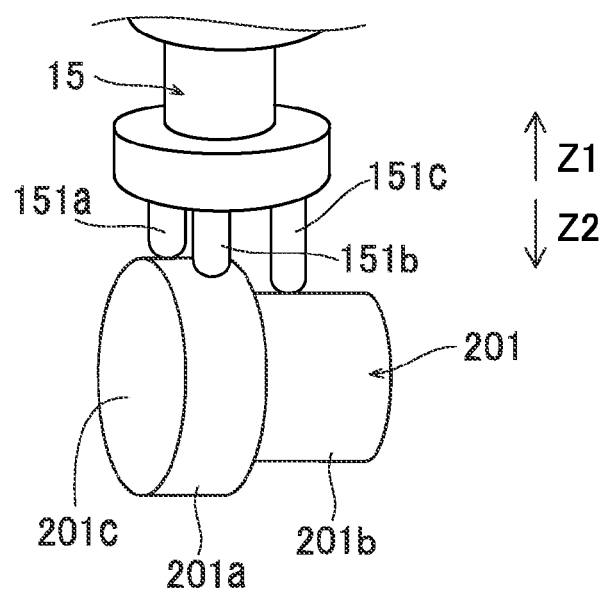
FIG. 4 is a perspective view of a workpiece held by the hand of the robot system according to the embodiment.

As shown in FIG. 4, each workpiece 201 includes a cylindrical first portion 201a and a cylindrical second portion 201b, which is smaller in diameter than the first portion 201a. Each workpiece 201 is made of a magnetic material.

Figure 2:
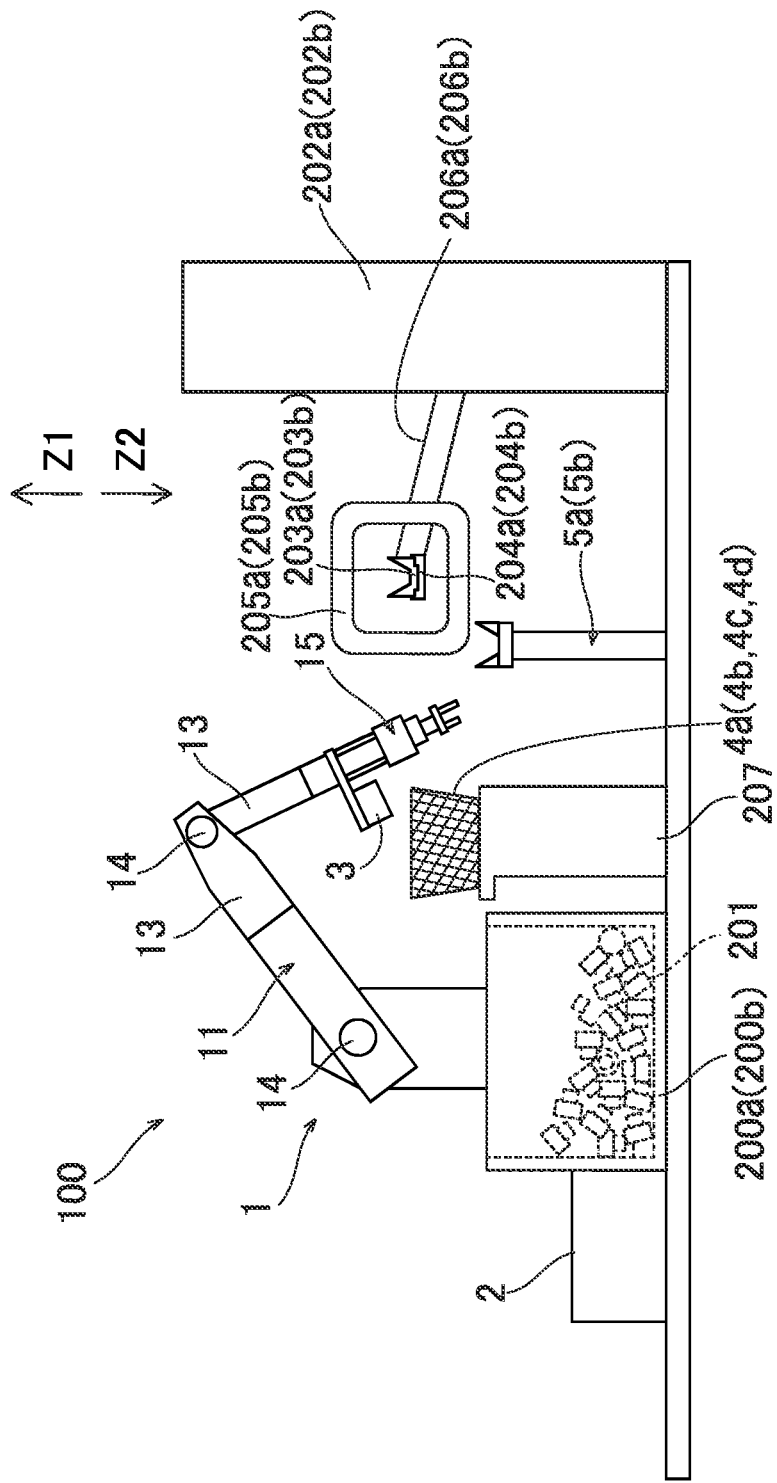
FIG. 2 is a side view of the entire robot system according to the embodiment.

As shown in FIGS. 1 and 2, the robot 1 is a multi-articular robot including a robot arm 11. The robot arm 11 includes a base 12, a plurality of arm parts 13, and a plurality of joints 14 coupling the arm parts 13 to each other. The robot arm 11 includes therein a servo motor (not shown) to drive the joints 14. Driving of the robot arm 11 (servo motor) is controlled by the robot controller 2.

Figure 3:
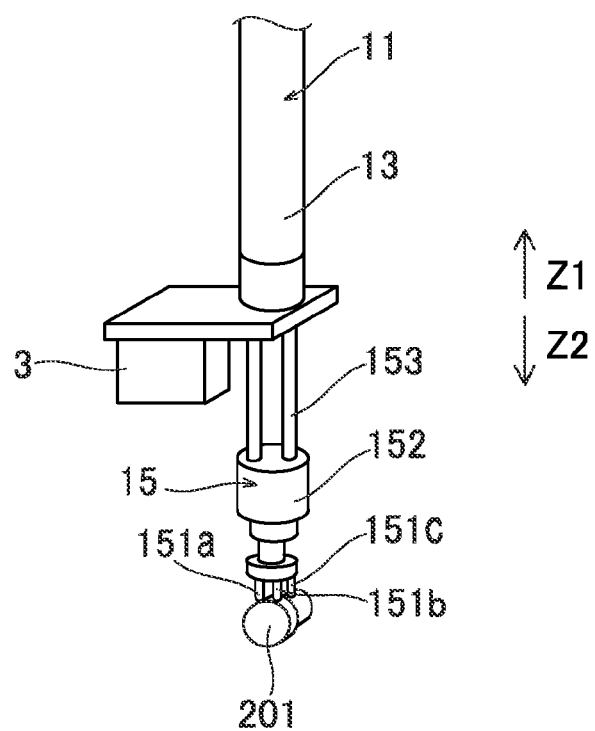
FIG. 3 is a perspective view of a hand of the robot system according to the embodiment.

As shown in FIG. 3, in this embodiment, a hand 15 of magnetic material is disposed at a distal end of the robot arm 11. The hand 15 magnetically holds a workpiece 201. The hand 15 includes three fingers 151a, 151b, and 151c. As shown in FIG. 4, the fingers 151a and 151b are shorter in length than the finger 151c so that the fingers 151a and 151b come into contact with the side surface of the larger diameter first portion 201a of the workpiece 201, while the finger 151c comes into contact with the side surface of the smaller diameter second portion 201b of the workpiece 201. The hand 15 also includes an electromagnet 152. The electromagnet 152 generates magnetic force to magnetize the fingers 151a, 151b, and 151c to enable the fingers 151a, 151b, and 151c to hold the workpiece 201. The hand 15 also includes a floating portion (spring) 153. When the hand 15 is pressed against the workpiece 201, the floating portion 153 functions to absorb the pressing force (impact) of the hand 15 against the workpiece 201. The hand 15 corresponds to the "holder" recited in the accompanying claims.

In this embodiment, the disposed-state detector 3 is disposed at the arm part 13 on the distal end side of the robot arm 11. The disposed-state detector 3 detects three-dimensional disposed states of a plurality of workpieces 201 disposed in the workpiece palettes 200a and 200b. The disposed-state detector 3 also detects three-dimensional disposed states of a plurality of workpieces 201 disposed in the temporary placement portions 4a, 4b, 4c, and 4d. Based on the disposed states of the plurality of respective workpieces 201 disposed in the workpiece palettes 200a and 200b detected by the disposed-state detector 3, the hand 15 of the robot arm 11 holds a workpiece 201. The held workpiece 201 is moved to the temporary placement portion 4a, 4b, 4c, or 4d. Then, the disposed-state detector 3 detects three-dimensional disposed states of a plurality of workpieces 201 disposed in the temporary placement portions 4a, 4b, 4c, and 4d. The detection of the disposed states of the respective workpieces 201 disposed in the workpiece palettes 200a and 200b is rougher (less detailed) than the detection of the disposed states of the respective workpieces 201 disposed in the temporary placement portions 4a, 4b, 4c, and 4d. Specifically, a two-dimensional disposed state of each workpiece 201 disposed in the workpiece palettes 200a and 200b is detected in the form of a plane (the orientation of the workpiece 201 is not detected). This is combined with detection of the height at which the workpiece 201 is disposed, resulting in a three-dimensional disposed state of each workpiece 201.

The disposed-state detector 3 detects disposed states of workpieces 201 moved to the temporary placement portions 4a, 4b, 4c, and 4d in more detail than when the disposed-state detector 3 detects the disposed states of the plurality of workpieces 201 disposed in the workpiece palettes 200a and 200b. Specifically, the disposed-state detector 3 is more meticulous about the workpieces 201 disposed in the temporary placement portions 4a, 4b, 4c, and 4d in that the disposed-state detector 3 detects the orientation of each workpiece 201 in addition to the two-dimensional disposed state of the workpiece 201 in the form of a plane and the height at which the workpiece 201 is disposed. For example, the disposed-state detector 3 detects whether the workpiece 201 is in vertical orientation or in horizontal orientation. In the vertical orientation, a flat portion 201c of the first portion 201a (see FIG. 4) is oriented upward (arrow Z1 direction) and downward (arrow Z2 direction). In the horizontal orientation, the flat portion 201c of the first portion 201a is oriented in the horizontal direction.

Figure 5:
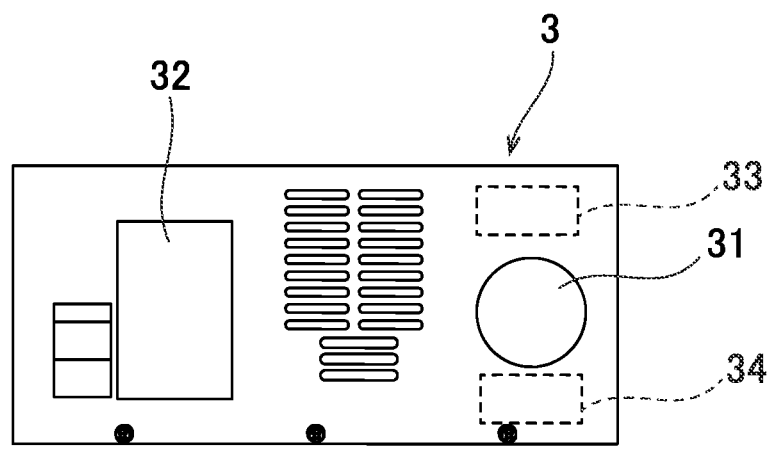
FIG. 5 is a front view of a disposed-state detector of the robot system according to the embodiment.
Figure 6:
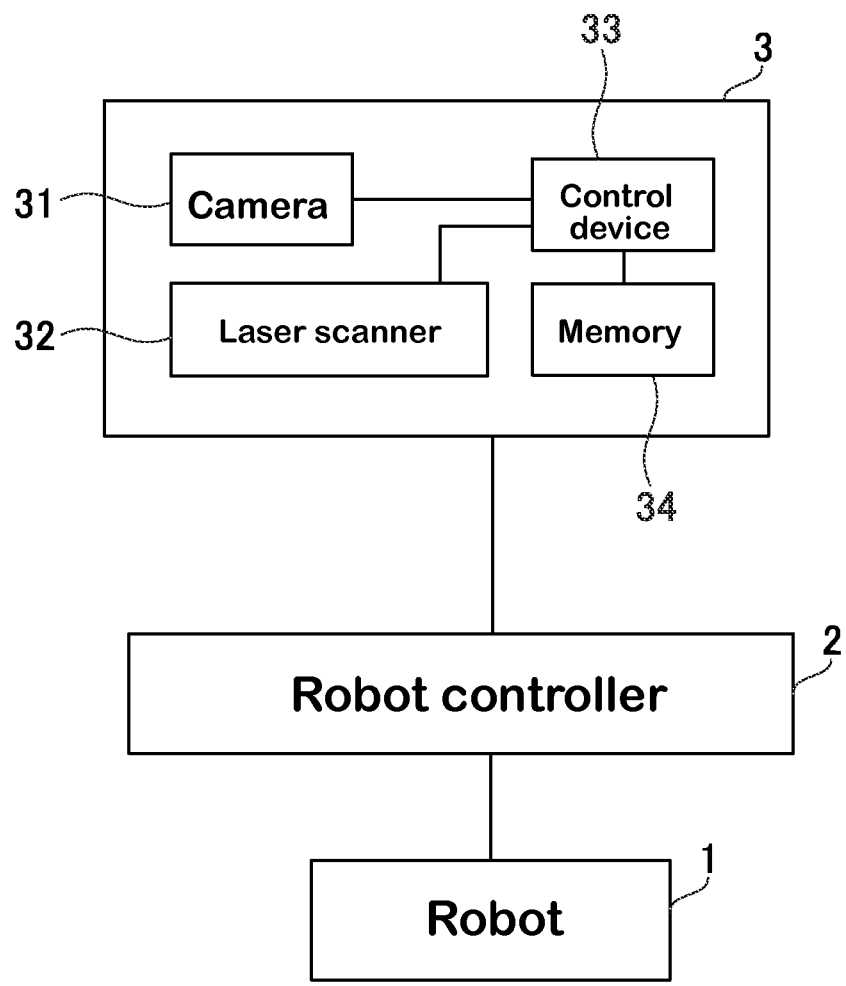
FIG. 6 is a block diagram of the robot system according to the embodiment.

As shown in FIGS. 5 and 6, the disposed-state detector 3 includes a camera 31, a laser scanner 32, a control device 33, and a memory 34. The laser scanner 32 and the control device 33 respectively correspond to the "laser projector" and the "distance operator" recited in the accompanying claims. The laser scanner 32 includes a laser light source (not shown), a mirror (not shown), and a motor (not shown). The laser light source generates slit light. The motor drives the mirror. The laser light source irradiates the mirror with slit laser light while the mirror is rotated by the motor, thereby irradiating (scanning) the workpieces 201 with slit laser light. The laser light radiated to the workpieces 201 is reflected to become reflected light, which is imaged by the camera 31. The control device 33 calculates the distance between the disposed-state detector 3 and each of the workpieces 201 (three-dimensional shape information of the workpieces 201 in the workpiece palettes 200a and 200b and in the temporary placement portions 4a, 4b, 4c, and 4d) using a principle of triangulation based on the rotational angle position information of the servo motor, the position of the image pick-up device of the camera 31, and a positional relationship among the laser light source, the mirror, and the camera. In this manner, the control device 33 obtains a distance image that contains distance information in every pixel of the image.

The control device 33 stores in advance characteristic information of the workpieces 201 to be detected, and compares the obtained distance image with the characteristic information of the workpieces 201 to obtain the position and posture of each workpiece 201. The characteristic information of each workpiece 201 may be simple information indicating the overall shape of the workpiece. To reduce the amount of operation, the characteristic information of each workpiece 201 to be stored may be a characteristic part of the workpiece 201 (such as a hole, bar-shaped portion, and a flat portion). Thus, the disposed-state detector 3 detects the disposed states of the plurality of workpieces 201 disposed in the workpiece palettes 200a and 200b (the temporary placement portions 4a, 4b, 4c, and 4d) based on the distance between the disposed-state detector 3 and each of the detected workpieces 201. Specifically, each individual workpiece 201 is discriminated by, for example, the size (length) of the detected portion or by the curved surface (corresponding to the side surface of the cylindrical workpiece 201). It is also possible to detect the disposed state of each individual workpiece 201 by having the memory 34 of the disposed-state detector 3 store three-dimensional shape information of the workpieces 201 in advance and by comparing the three-dimensional shape information of the workpieces 201 stored in advance in the memory 34 with the three-dimensional shape information of the detected workpieces 201 disposed in the workpiece palettes 200a and 200b (the temporary placement portions 4a, 4b, 4c, and 4d). As shown in FIG. 1, the disposed-state detector 3 is coupled to the robot controller 2 through a cable 35.

As shown in FIG. 1, the robot controller 2 is coupled to the robot 1 and the disposed-state detector 3. In this embodiment, the robot controller 2 controls the robot arm 11 to have the hand 15 magnetically hold a workpiece 201 among the plurality of workpieces 201 preliminarily disposed in the workpiece palette 200a or 200b before the plurality of workpieces 201 are held by the hand 15, and controls the robot arm 11 to move the workpiece 201 held by the hand 15 to the temporary placement portion 4a, 4b, 4c, or 4d, which is reticulated. Based on the orientation of the detected workpiece 201 in the temporary placement portion 4a, 4b, 4c, or 4d (based on whether the workpiece 201 is in vertical orientation or in horizontal orientation), the robot controller 2 selects between controlling the robot arm 11 to place the workpiece 201 onto the re-holding table 5a or 5b and change the orientation of the workpiece 201 on the re-holding table 5a or 5b, and controlling the robot arm 11 to transfer the workpiece 201 to the machine 202a or 202b in charge of the next process (through the workpiece receiver 203a or 203b) without placing the workpiece 201 onto the re-holding table 5a or 5b. Specifically, when the workpiece 201 is in vertical orientation in the temporary placement portion 4a, 4b, 4c, or 4d, the robot controller 2 controls the robot arm 11 to place the workpiece 201 onto the re-holding table 5a or 5b and change the orientation of the workpiece 201 into horizontal orientation (see FIGS. 8 and 9). When the workpiece 201 is in horizontal orientation in the temporary placement portion 4a, 4b, 4c, or 4d, the robot controller 2 controls the robot arm 11 to transfer the workpiece 201 to the machine 202a or 202b in charge of the next process (through the workpiece receiver 203a or 203b) without placing the workpiece 201 onto the re-holding table 5a or 5b. The robot controller 2 stores in advance the positions of four corners 41 (see FIG. 7) of the temporary placement portions 4a, 4b, 4c, and 4d in terms of coordinates. This ensures that the robot controller 2 controls the robot arm 11 to avoid contact with the temporary placement portions 4a, 4b, 4c, and 4d.

The workpiece palettes 200a and 200b are each made of metal or resin, and as shown in FIG. 2, the plurality of workpieces 201 are disposed in the workpiece palettes 200a and 200b in a random manner (in bulk).

Figure 7:
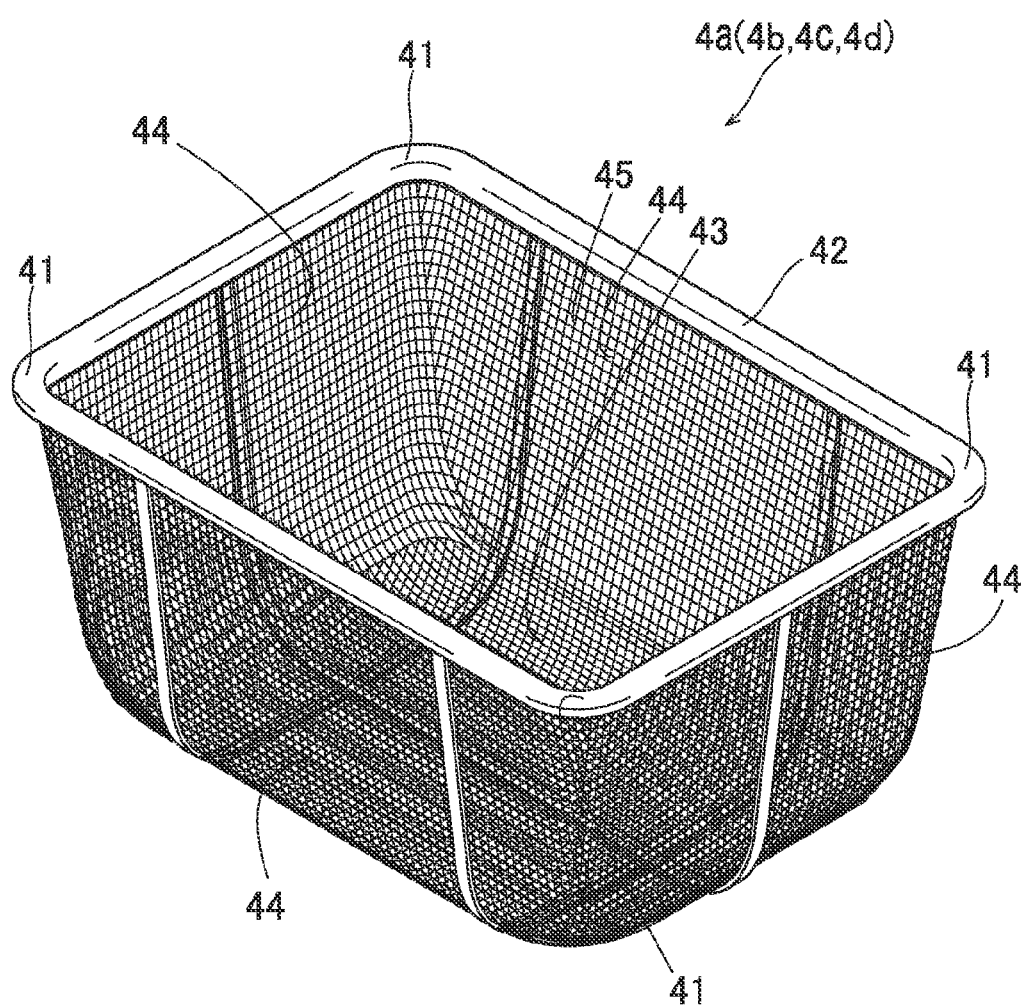
FIG. 7 is a perspective view of a temporary placement portion of the robot system according to the embodiment.
Figure 12:
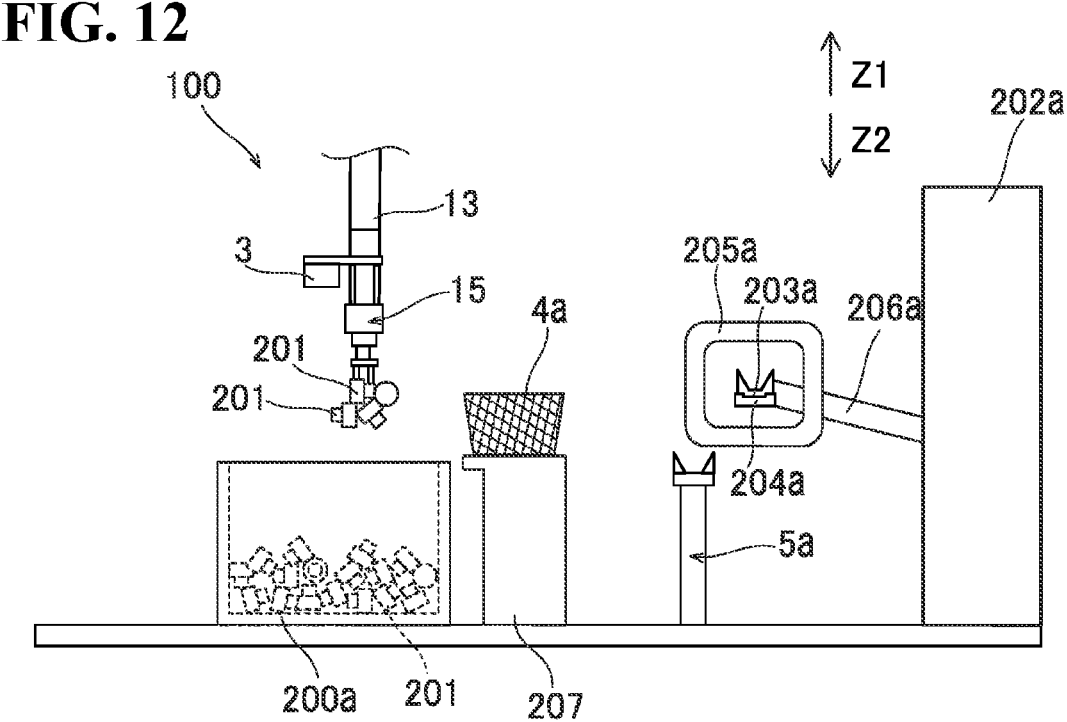
FIG. 12 illustrates a workpiece held by the hand of the robot system according to the embodiment.

As shown in FIGS. 1 and 2, the temporary placement portion 4a (the temporary placement portion 4b, 4c, or 4d) is disposed on a temporary placement table 207. In this embodiment, as shown in FIG. 7, the temporary placement portion 4a (the temporary placement portion 4b, 4c, or 4d) is in the form of a box. The temporary placement portion 4a (the temporary placement portion 4b, 4c, or 4d) includes a reticulated bottom surface 43, reticulated side surfaces 44, and non-reticulated frames 42. The side surfaces 44 of the temporary placement portion 4a (the temporary placement portion 4b, 4c, or 4d) are inclined such that the distance between opposed side surfaces 44 increases as the opposed side surfaces 44 extend upward from the bottom surface 43. The side surfaces 44 of the temporary placement portion 4a (the temporary placement portion 4b, 4c, or 4d) eliminate or minimize spilling of the workpieces 201 out of the temporary placement portion 4a (the temporary placement portion 4b, 4c, or 4d). The temporary placement portion 4a (the temporary placement portions 4b, 4c, and 4d) is made of a magnetic material such as iron. The reticulated portions of the temporary placement portion 4a (the temporary placement portion 4b, 4c, or 4d) are each made up of linear members 45 (such as wires) each having a circular cross-section. Each of the linear members 45 has a thickness (diameter) smaller than a thickness detectable by the disposed-state detector 3. Specifically, each linear member 45, which has a circular cross-section, has a thickness (diameter) of equal to or less than 1 mm. The bottom surface 43 of the temporary placement portion 4a has an area of space that accommodates a number of workpieces 201 (for example, four workpieces 201 as shown in FIG. 12) that the hand 15 of the robot arm 11 is able to magnetically hold while ensuring that the workpieces 201 are in flat orientation in the area of space without overlapping of the workpieces 201.

Figure 8:
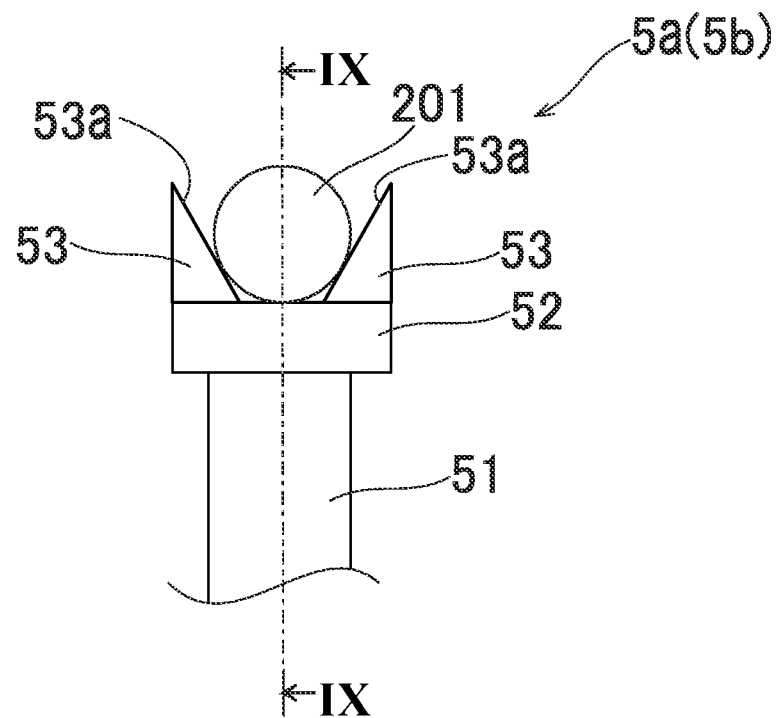
FIG. 8 is a front view of a re-holding table of the robot system according to the embodiment.
Figure 9:
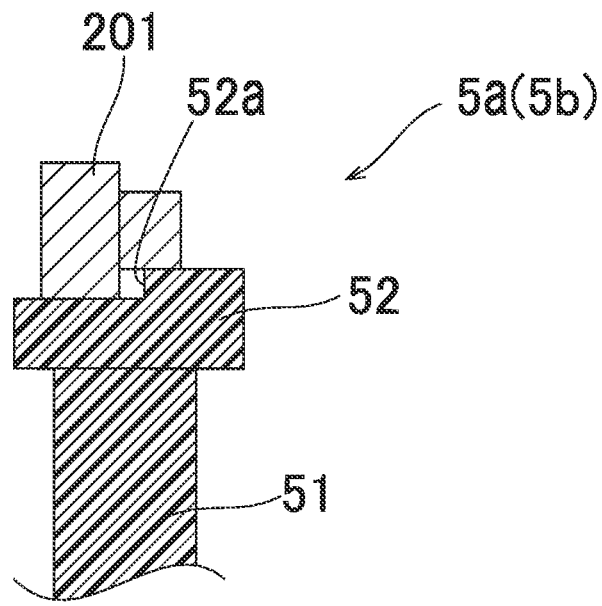
FIG. 9 is a cross-sectional view of the re-holding table taken along the line IX-IX shown in FIG. 8.

As shown in FIGS. 8 and 9, the re-holding table 5a (re-holding table 5b) includes a column 51, a bottom 52, and two side walls 53. The bottom 52 is in the form of a plane. The side walls 53 each include an inclined surface 53a coupled to the bottom 52. The planar bottom 52 has a step 52a. The larger diameter first portion 201a of a workpiece 201 is to be put onto the planar bottom 52 below the step 52a, while the smaller diameter second portion 201b of the workpiece 201 is to be put onto the bottom 52 above the step 52a. The inclined surfaces 53a of the side walls 53 are opposed to one another such that the workpiece 201, when put onto the bottom 52, comes into contact with the opposed inclined surfaces 53a.

As shown in FIG. 1, the track 204a (track 204b) is disposed adjacent the re-holding table 5a (re-holding table 5b). On the track 204a (track 204b), the workpiece receiver 203a (workpiece receiver 203b) is disposed. The workpiece receiver 203a (workpiece receiver 203b) has a function of receiving the workpiece 201 held by the hand 15, moving along the track 204a (track 204b), and introducing the workpiece 201 to the workpiece introducer 206a (workpiece introducer 206b). The track 204a (track 204b) passes through the demagnetizer 205a (demagnetizer 205b) so as to demagnetize the magnetized workpiece 201.

Next, referring to FIGS. 10 to 17, an operation of the robot system 100 according to this embodiment will be described. In the following description, a workpiece 201 disposed in the workpiece palette 200a is transferred to the machine 202a in charge of the next process.

Figure 10:
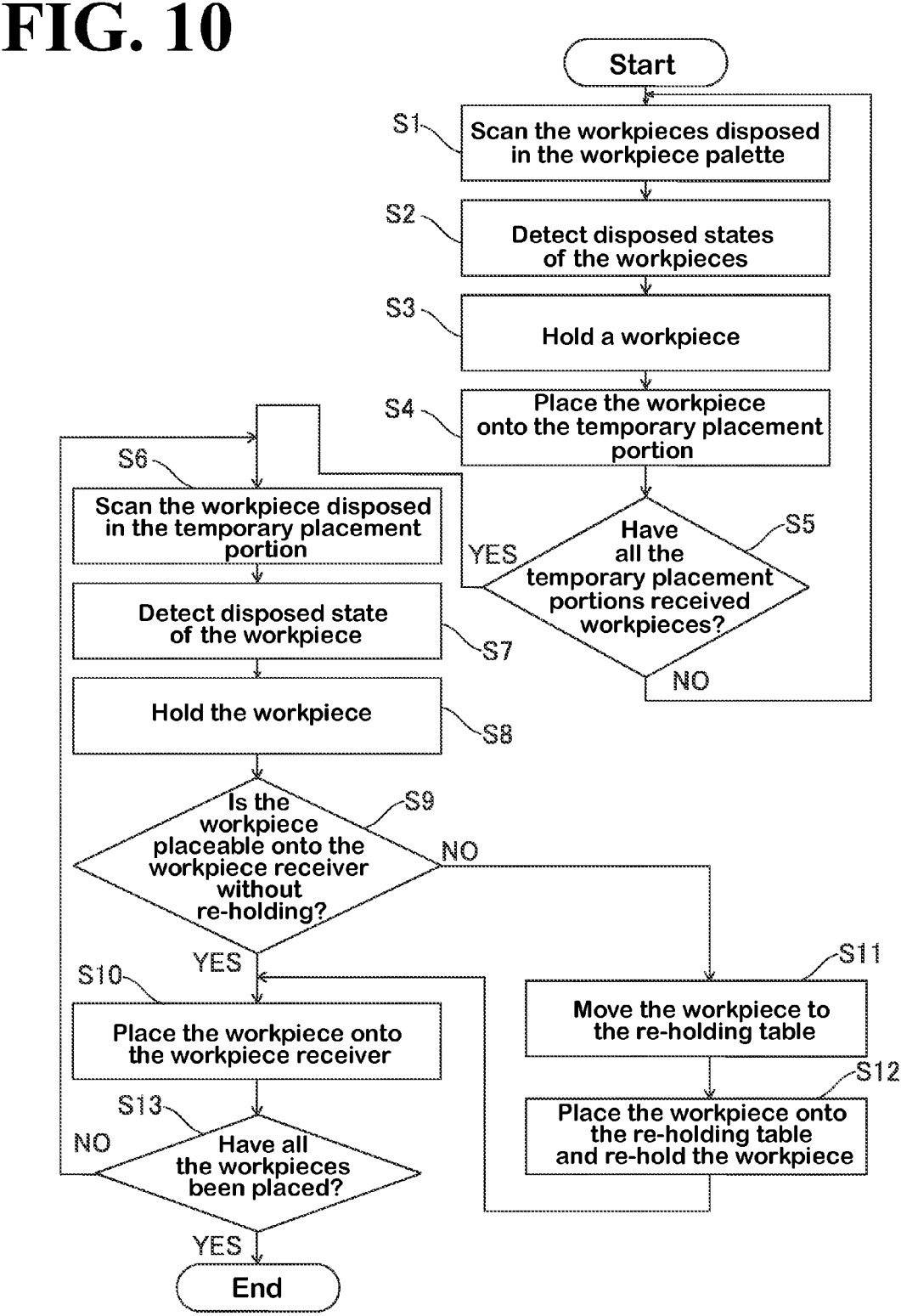
FIG. 10 is a flowchart describing a control flow of the robot system according to the embodiment.
Figure 11:
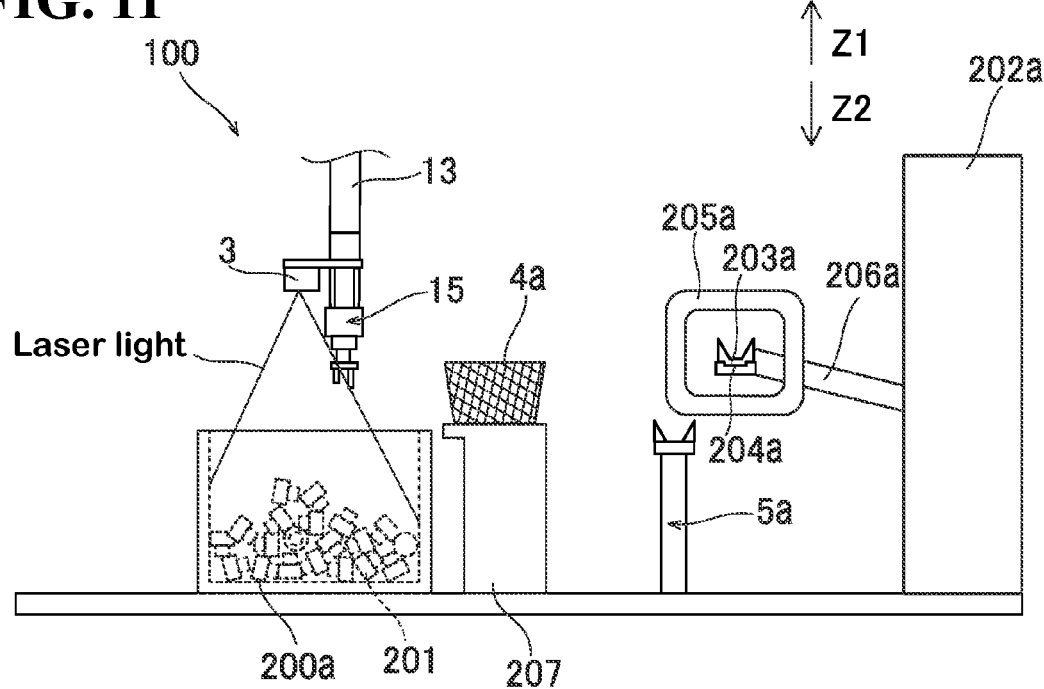
FIG. 11 illustrates scanning of workpieces disposed in a workpiece palette by the disposed-state detector of the robot system according to the embodiment.

At step 1 shown in FIG. 10, the disposed-state detector 3 moves over the workpiece palette 200a (on the arrow Z1 direction side), and radiates laser light to the bulk of workpieces 201 disposed in the workpiece palette 200a so as to scan the bulk of workpieces 201, as shown in FIG. 11. At step 2, the disposed-state detector 3 detects the distance between the disposed-state detector 3 and each of the workpieces 201 (three-dimensional shape information of the workpieces 201 disposed in the workpiece palette 200a). Based on the detected three-dimensional shape information of the workpieces 201 disposed in the workpiece palette 200a, the disposed-state detector 3 detects disposed states of the respective workpieces 201 disposed in the workpiece palette 200a. The detection of the disposed states of the respective workpieces 201 disposed in the workpiece palette 200a is rougher (less detailed) than the detection of the disposed states of the respective workpieces 201 disposed in the temporary placement portion 4a (temporary placement portion 4b), as described later.

At step S3, the hand 15 magnetically holds a workpiece 201 that is, for example, at the highest position in the workpiece palette 200a, as shown in FIG. 12. This involves magnetization of the workpiece 201, which is made of a magnetic material, and the magnetized workpiece 201 magnetically attracts other workpieces 201, resulting in the hand 15 holding a plurality of workpieces 201 (four workpieces 201 in FIG. 12).

Figure 13:
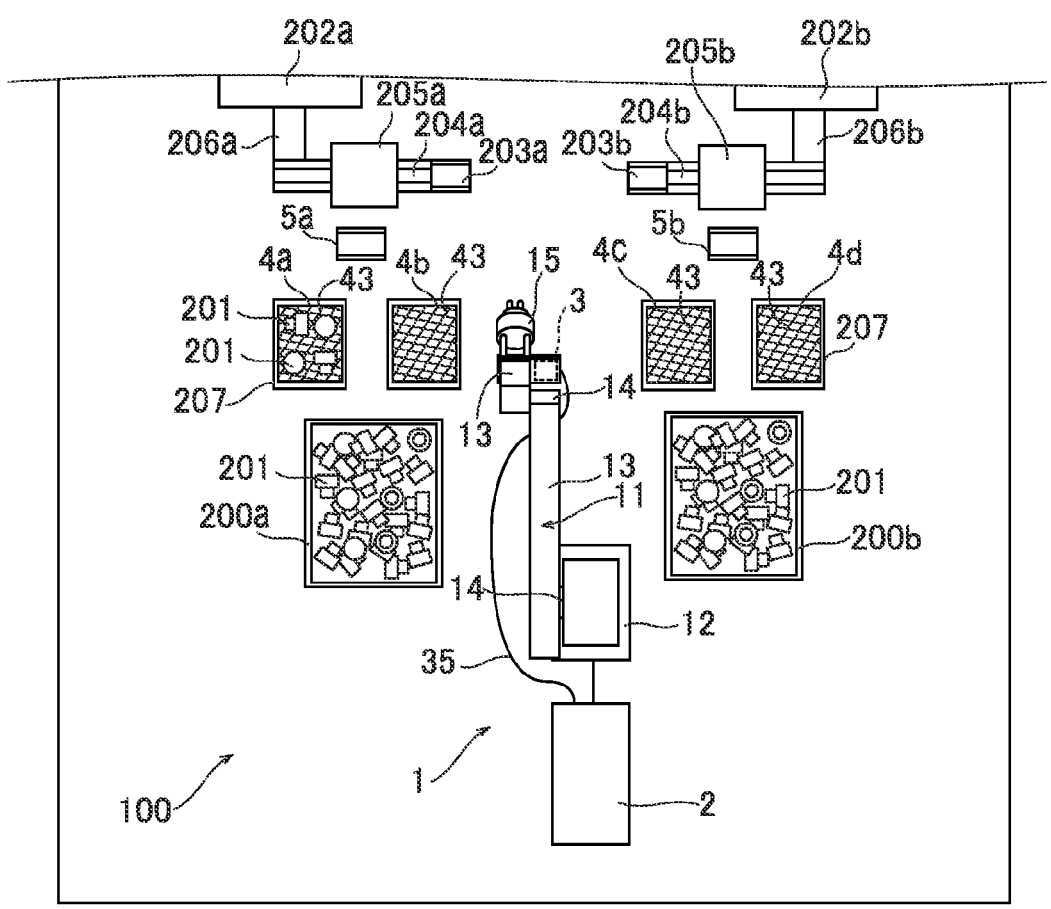
FIG. 13 illustrates a workpiece placed onto the temporary placement portion by the hand of the robot system according to the embodiment.

At step S4, the plurality of workpieces 201 are placed onto the temporary placement portion 4a, as shown in FIG. 13. Next, at step S5, a determination is made as to whether all the temporary placement portions (in this embodiment, the temporary placement portion 4a and the temporary placement portion 4b) have received workpieces 201. For example, when the determination indicates that no workpieces 201 are placed in the temporary placement portion 4b, the operations of steps S1 to S4 are repeated so as to place a plurality of workpieces 201 onto the temporary placement portion 4b. The bottom surface 43 of the temporary placement portion 4a has an area of space that accommodates the plurality of workpieces 201 in flat orientation without overlapping of the plurality of workpieces 201. This ensures that the plurality of workpieces 201 are disposed in flat orientation in the temporary placement portion 4a without overlapping of the plurality of workpieces 201.

Figure 14:
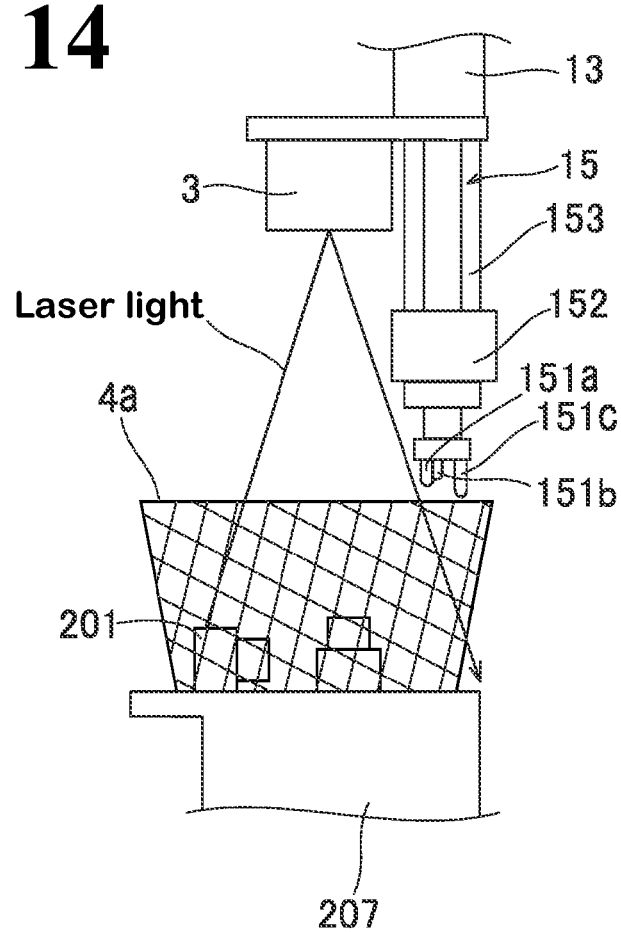
FIG. 14 illustrates scanning of a workpiece on the temporary placement portion by the disposed-state detector of the robot system according to the embodiment.
Figure 15:
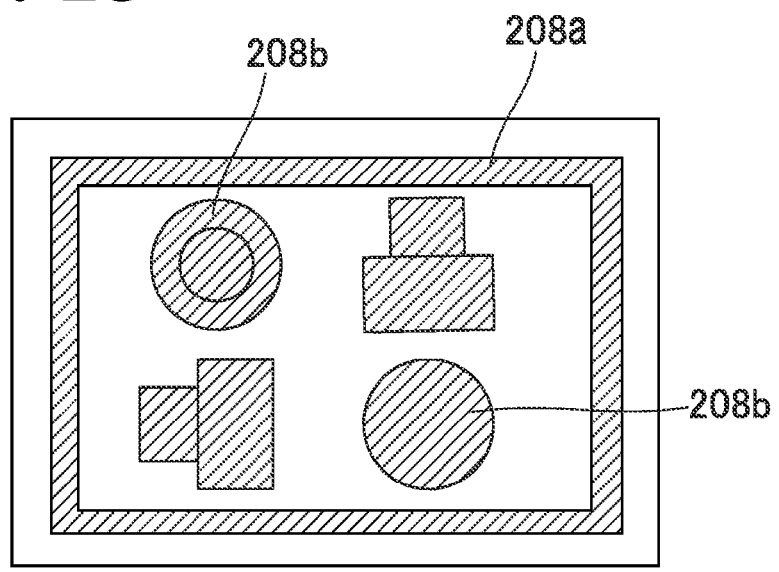
FIG. 15 shows an image picked up by the disposed-state detector of the robot system according to the embodiment.

When at step 5 the determination indicates that all the temporary placement portions (in this embodiment, the temporary placement portion 4a and the temporary placement portion 4b) have received workpieces 201, the process proceeds to step S6. At step S6, the disposed-state detector 3 radiates laser light to the plurality of workpieces 201 disposed in the temporary placement portion 4a so as to scan the plurality of workpieces 201, as shown in FIG. 14. For example, the disposed-state detector 3 picks up an image 208a of the frame 42 of the temporary placement portion 4a and an image 208b of the four workpieces 201, as shown in FIG. 15. Since the temporary placement portion 4a is reticulated, the laser light partially passes through the temporary placement portion 4a instead of being reflected by the temporary placement portion 4a. This makes the temporary placement portion 4a excluding the frame 42 difficult to image. Some of the plurality of workpieces 201, immediately after being placed onto the temporary placement portion 4a, may at times be moving about (rolling in) the temporary placement portion 4a. Still, these workpieces 201 end up being stationary in the temporary placement portion 4a while the temporary placement portion 4b is receiving its workpieces 201 after the temporary placement portion 4a received its own workpieces 201. This ensures that the plurality of workpieces 201 are in stable state in the temporary placement portion 4a when the plurality of workpieces 201 are detected by the disposed-state detector 3. It should be noted that using a single temporary placement portion instead of using the two temporary placement portions 4a and 4b involves waiting for the workpieces 201 to turn into stable state, resulting in an elongated tact time.

Next, at step 7, the disposed-state detector 3 detects the distance between the disposed-state detector 3 and each of the plurality of workpieces 201 (three-dimensional shape information of the workpieces 201 disposed in the temporary placement portion 4a). The detection of the disposed states of the respective workpieces 201 disposed in the temporary placement portion 4a is more detailed than the detection at step S2 of the disposed states of the respective workpieces 201 disposed in the workpiece palette 200a. Next, at step S8, based on the detected disposed states of the respective workpieces 201, the hand 15 magnetically holds one workpiece 201 among the plurality of workpieces 201.

Figure 16:
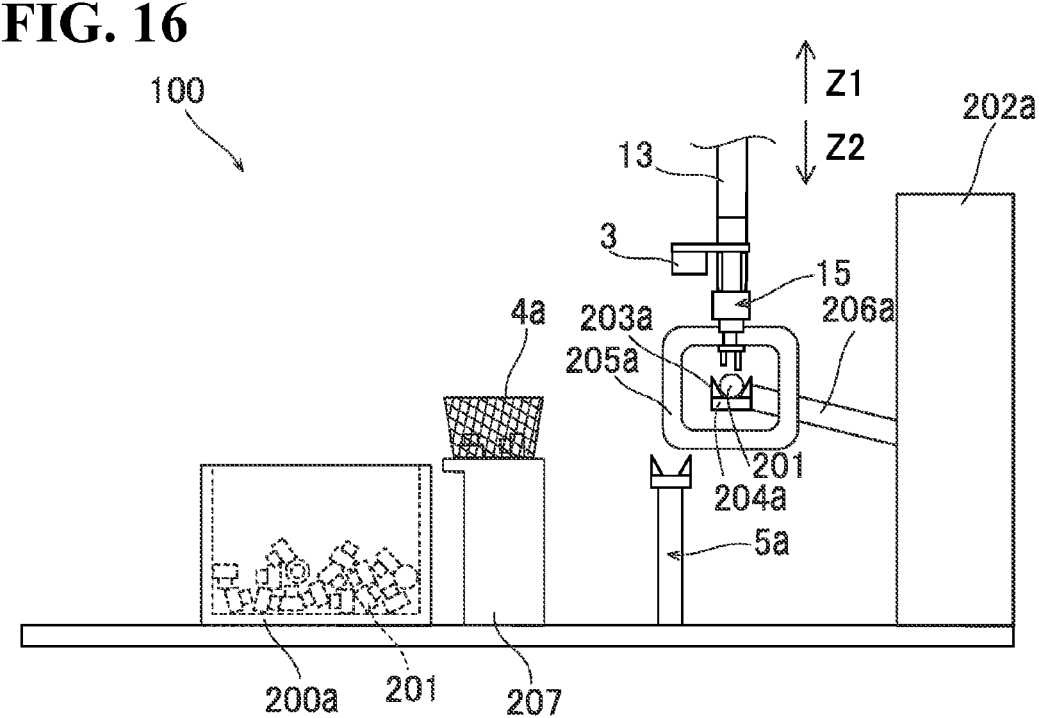
FIG. 16 illustrates a workpiece placed onto a workpiece receiver by the hand of the robot system according to the embodiment.

Next, at step S9, a determination is made as to whether the held workpiece 201 needs re-holding. When at step 9 the determination indicates that the held workpiece 201 does not need re-holding, the process proceeds to step S10. At step S10, the one workpiece 201 is placed onto the workpiece receiver 203a on the track 204a, as shown in FIG. 16. Specifically, the one workpiece 201 is determined as not needing re-holding when the one workpiece 201 is held in its horizontal orientation in the temporary placement portion 4a (that is, when the flat portion 201c of the first portion 201a (see FIG. 4) is oriented in the horizontal direction). Then, the workpiece receiver 203a loaded with the one workpiece 201 moves along the track 204a while having the magnetized one workpiece 201 demagnetized by the demagnetizer 205a. Then, the workpiece receiver 203a overturns to the workpiece introducer 206a side so as to introduce the one workpiece 201 to the workpiece introducer 206a, which in turn transfers the one workpiece 201 to the machine 202a in charge of the next process. Then, the next process (for example, processing the workpiece 201) is executed on the machine 202a.

Figure 17:
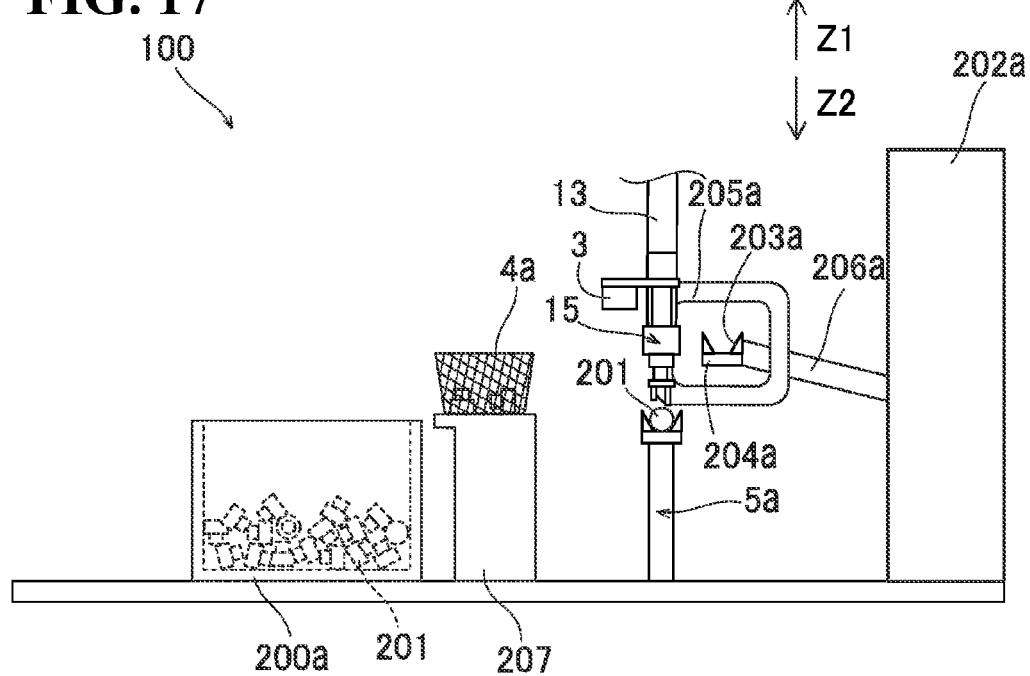
FIG. 17 illustrates a workpiece placed onto the re-holding table by the hand of the robot system according to the embodiment.

When at step 9 the one workpiece 201 is held in its vertical orientation (that is, when the flat portion 201c of the first portion 201a (see FIG. 4) is oriented in the arrow Z1 direction or in the arrow Z2 direction), the one workpiece 201 is determined as needing re-holding. In this case, the process proceeds to step S11. At step S11, the hand 15 holding the one workpiece 201 is moved to the re-holding table 5a. At step 12, the one workpiece 201 in vertical orientation is placed onto the re-holding table 5a and turned into horizontal orientation, as shown in FIG. 17. Then, at step S10, the one workpiece 201 is placed onto the workpiece receiver 203a on the track 204a. Then, the one workpiece 201 is transferred to the machine 202a in charge of the next process.

Next, at step 13, a determination is made as to whether all the plurality of workpieces 201 have been taken out of the temporary placement portion 4a and placed onto the workpiece receiver 203a. When at step 13 the determination indicates that not all the plurality of workpieces 201 have been taken out of the temporary placement portion 4a and placed onto the workpiece receiver 203a, the operations of steps S8 to S12 are repeated. When at step 13 the determination indicates that all the plurality of workpieces 201 have been taken out of the temporary placement portion 4a and placed onto the workpiece receiver 203a, the operations of steps S1 to S13 are repeated. Then, when no workpieces 201 are left in the workpiece palette 200a, the workpieces 201 disposed in the workpiece palette 200b undergo the operations of steps S1 to S13, similarly to the workpieces 201 disposed in the workpiece palette 200a. Meanwhile, the workpiece palette 200a is replaced with a new workpiece palette 200a loaded with workpieces 201. This eliminates or minimizes a loss of time inherent in a single workpiece palette when the single workpiece palette runs out of workpieces 201 and is replenished with new workpieces 201.

In this embodiment, the temporary placement portions 4a, 4b, 4c, and 4d each accommodate a plurality of workpieces 201 and include reticulated portions, and the disposed-state detector 3 detects disposed states of the plurality of respective workpieces 201 disposed in the temporary placement portions 4a, 4b, 4c, and 4d, as described above. Since the temporary placement portions 4a, 4b, 4c, and 4d are reticulated, the laser light associated with detection (imaging) of the workpieces 201 partially passes through the temporary placement portions 4a, 4b, 4c, and 4d instead of being reflected by the temporary placement portions 4a, 4b, 4c, and 4d. This reduces the amount of laser light reflection at the temporary placement portions 4a, 4b, 4c, and 4d, and eliminates or minimizes halation (blurring) associated with detection of the workpieces 201.

Additionally, the temporary placement portions 4a, 4b, 4c, and 4d are reticulated at the bottom surface 43 and the side surfaces 44, and these reticulated portions are difficult to detect by the disposed-state detector 3. This eliminates or minimizes appearance of the image of the temporary placement portion 4a, 4b, 4c, or 4d together with the image of the workpieces 201. This leads to accurate detection of the shapes of the workpieces 201. Also since the temporary placement portions 4a, 4b, 4c, and 4d are reticulated, when the hand 15 of the robot arm 11 magnetically holds a workpiece 201, no or minimal magnetic attraction occurs between the magnetized workpiece 201 and the temporary placement portion 4a, 4b, 4c, or 4d. This eliminates or minimizes degraded accuracy of the hand 15 holding the workpiece 201 (that is, mis-positioning between the hand 15 and the workpiece 201), which would be caused when the hand 15 holds the workpiece 201 and if the workpiece 201 held by the hand 15 were magnetically attracted to the temporary placement portion 4a, 4b, 4c, or 4d.

In this embodiment, the bottom surface 43 of each of the temporary placement portions 4a, 4b, 4c, and 4d is reticulated, as described above. This ensures that the laser light associated with detection (imaging) of the workpieces 201 partially passes through the reticulated bottom surface 43, thereby reducing the amount of laser light reflection at the bottom surface 43. This, as a result, facilitates the attempt to eliminate or minimize halation (blurring) associated with detection of the workpieces 201.

In this embodiment, the side surfaces 44 of each of the temporary placement portions 4a, 4b, 4c, and 4d are reticulated, as described above. This ensures that the laser light associated with detection (imaging) of the workpieces 201 partially passes through the reticulated side surfaces 44, thereby reducing the amount of laser light reflection at the side surfaces 44. This, as a result, facilitates the attempt to eliminate or minimize halation (blurring) associated with detection of the workpieces 201.

In this embodiment, the side surfaces 44 of each of the temporary placement portions 4a, 4b, 4c, and 4d, which accommodate a plurality of workpieces 201, are inclined such that the distance between opposed side surfaces 44 increases as the opposed side surfaces 44 extend upward from the bottom surface 43. Making the side surfaces 44 inclined eliminates or minimizes contact of the hand 15 (specifically, for example, the electromagnet 152 of the hand 15) with the side surfaces 44 of the temporary placement portions 4a, 4b, 4c, and 4d.

In this embodiment, the linear members 45 constituting the reticulated portions of the temporary placement portions 4a, 4b, 4c, and 4d each have a circular cross-section, as described above. Since the linear members 45 each have a circular cross-section, the laser light that the disposed-state detector 3 radiates to the linear members 45 is partially reflected to elements other than the disposed-state detector 3. This, as a result, more effectively eliminates or minimizes halation (blurring) associated with detection of the workpieces 201.

In this embodiment, the reticulated portions of the temporary placement portions 4a, 4b, 4c, and 4d are made of the linear members 45, and each linear member 45 has a thickness smaller than a thickness detectable by the disposed-state detector 3, as described above. This eliminates or minimizes detection of the reticulated portions of the temporary placement portions 4a, 4b, 4c, and 4d by the disposed-state detector 3. This in turn eliminates or minimizes appearance of the image of the temporary placement portion 4a, 4b, 4c, or 4d together with the image of the workpieces 201.

In this embodiment, the control device 33 calculates three-dimensional disposed states of the plurality of respective workpieces 201 disposed in the reticulated temporary placement portions 4a, 4b, 4c, and 4d based on images obtained from the camera 31, as described above. This ensures detection of the distance between the disposed-state detector 3 and each of the workpieces 201 in addition to two-dimensional disposed states (disposed states in the horizontal direction) of the respective workpieces 201. This eliminates or minimizes forceful contact, and resulting damage, of a workpiece 201 against the hand 15 of the robot arm 11 when the hand 15 holds the workpiece 201.

In this embodiment, the disposed-state detector 3 is disposed on the robot arm 11 to detect the disposed states of the plurality of respective workpieces 201 disposed in the temporary placement portions 4a, 4b, 4c, and 4d, as described above. Thus, driving the robot arm 11 enables this single disposed-state detector 3 to detect the disposed states of the plurality of respective workpieces 201 disposed in the temporary placement portions 4a, 4b, 4c, and 4d and additionally to detect the disposed states of the plurality of respective workpieces 201 disposed in the workpiece palettes 200a and 200b. This ensures a simplified configuration compared with a double disposed-state detector configuration, where two disposed-state detectors 3 would be disposed independently of the robot arm 11, with one disposed-state detector 3 dedicated to detecting the plurality of workpieces 201 disposed in the temporary placement portions 4a, 4b, 4c, and 4d and the other disposed-state detector 3 dedicated to detecting the plurality of workpieces 201 disposed in the workpiece palettes 200a and 200b.

In this embodiment, the hand 15 of the robot arm 11 magnetically holds a workpiece 201 disposed in the temporary placement portions 4a, 4b, 4c, and 4d (the workpiece palettes 200a and 200b), as described above. Utilizing magnetic force facilitates holding of a workpiece 201 even when the workpiece 201 has a rough surface that is difficult to suck by a sucker or when there are a plurality of workpieces 201 disposed too close to each other for the hand to pick one workpiece 201 out of the plurality of workpieces 201.

In this embodiment, the robot controller 2 controls the robot arm 11 to have its hand 15 magnetically hold a workpiece 201 from the workpiece palette 200a or 200b and to move the workpiece 201 held by the hand 15 to the reticulated temporary placement portion 4a, 4b, 4c, or 4d, as described above. The magnetic force of the hand 15 can magnetize a plurality of workpieces 201, and the magnetized workpieces 201 can attract each other and be collectively held by the hand 15. These mutually attracting workpieces 201, however, are separated from each other once they are moved to the reticulated temporary placement portion 4a, 4b, 4c, or 4d. This enables the hand 15 to re-hold one workpiece 201 among the plurality of separated workpieces 201.

In this embodiment, the temporary placement portions 4a, 4b, 4c, and 4d each have an area of space that accommodates a number of workpieces 201 that the hand 15 is able to hold while ensuring that the workpieces 201 are in flat orientation in the area of space without overlapping of the workpieces 201, as described above. Even when the hand 15 holds a plurality of workpieces 201, moving the plurality of workpieces 201 to the reticulated temporary placement portion 4a, 4b, 4c, or 4d ensures that the plurality of mutually attracting workpieces 201 are turned into flat orientation in the temporary placement portion 4a, 4b, 4c, or 4d. This enables the robot arm 11 to hold a workpiece 201 among the plurality of workpieces 201 by the simple act of moving the robot arm 11 in an approximately perpendicularly downward direction from above the temporary placement portion 4a, 4b, 4c, or 4d, with no or minimal interference (contact) of the robot arm 11 with the other workpieces 201.

In this embodiment, the disposed-state detector 3 detects a plurality of workpieces 201 disposed in the workpiece palette 200a or 200b, after which at least one of the plurality of workpieces 201 are moved from the workpiece palette 200a or 200b to the temporary placement portion 4a, 4b, 4c, or 4d. The disposed-state detector 3 detects the workpiece 201 moved to the temporary placement portion 4a, 4b, 4c, or 4d in more detail than when the disposed-state detector 3 detects the plurality of workpieces 201 disposed in the workpiece palette 200a or 200b, as described above. The detailed detection provides additional information (the orientation of the workpiece 201) as well as a two-dimensional disposed-state of the workpiece 201 and the height at which the workpiece 201 is disposed.

In this embodiment, the disposed-state detector 3 detects the orientation of a workpiece 201 disposed in the temporary placement portion 4a, 4b, 4c, or 4d, as described above. This ensures that the robot arm 11 is driven differently depending on whether the orientation of the workpiece 201 is suitable or not for transfer of the workpiece 201 to the next process.

In this embodiment, the re-holding tables 5a and 5b are provided on which to change the orientation of a workpiece 201. Based on the orientation of a detected workpiece 201 in the temporary placement portion 4a, 4b, 4c, or 4d, the robot controller 2 selects between controlling the robot arm 11 to place the workpiece 201 onto the re-holding table 5a or 5b and change the orientation of the workpiece 201 on the re-holding table 5a or 5b, and controlling the robot arm 11 to transfer the workpiece 201 to the next process (the workpiece receiver 203a or 203b) without placing the workpiece 201 onto the re-holding table 5a or 5b, as described above. When the orientation of the workpiece 201 is not suitable for transfer of the workpiece 201 to the next process, the workpiece 201 is placed onto the re-holding table 5a or 5b, where the orientation of the workpiece 201 is changed. This ensures appropriate transfer of the workpiece 201 to the next process.

While in the above-described embodiment each temporary placement portion is reticulated at its bottom surface and side surfaces, this should not be construed in a limiting sense. Reticulation of only one part of each temporary placement portion (such as at its bottom surface alone and side surfaces alone) suffices.

In the above-described embodiment, the side surfaces of each temporary placement portion are inclined such that the distance between opposed side surfaces increases as the opposed side surfaces extend upward from the bottom surface. This, however, should not be construed in a limiting sense. For example, the side surfaces of each temporary placement portion may extend in an approximately perpendicular direction instead of being inclined.

While in the above-described embodiment each temporary placement portion is made of linear members each having a circular cross-section, this should not be construed in a limiting sense. For example, each temporary placement portion may be made of linear members each having a rectangular cross-section.

While in the above-described embodiment each temporary placement portion is made of a magnetic material, this should not be construed in a limiting sense. For example, each temporary placement portion may be made of a non-magnetic material.

While in the above-described embodiment two temporary placement portions are dedicated to a single workpiece palette, this should not be construed in a limiting sense. For example, one or three or more temporary placement portions may be dedicated to a single workpiece palette.

While in the above-described embodiment the disposed-state detector radiates laser light to detect three-dimensional disposed states of respective workpieces, this should not be construed in a limiting sense. For example, the disposed-state detector may be a CCD or CMOS sensor to detect two-dimensional disposed states of respective workpieces.

While in the above-described embodiment the disposed-state detector is disposed on the robot arm, this should not be construed in a limiting sense. For example, the disposed-state detector may be separate from the robot arm (for example, disposed above the workpiece palettes and the temporary placement portions), instead of being disposed on the robot arm.

While in the above-described embodiment the hand of the robot arm magnetically holds a workpiece, this should not be construed in a limiting sense. For example, the hand of the robot arm may hold a workpiece by gripping or by sucking using a sucker.

Figure 18:
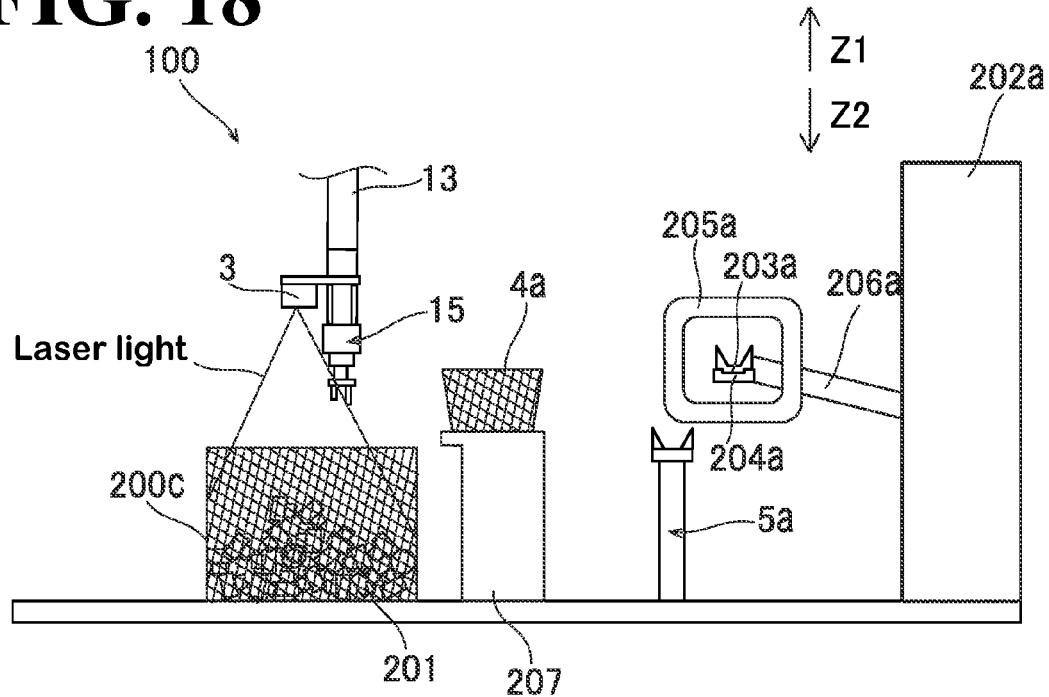
FIG. 18 is a side view of the entire robot system according to a first modification of the embodiment.

While in the above-described embodiment each temporary placement portion is reticulated, this should not be construed in a limiting sense. For example, as shown in FIG. 18, it is also possible to provide a reticulated workpiece palette 200c (with a reticulated bottom surface and reticulated side surfaces), in addition to the reticulated temporary placement portions. It is also possible to make each temporary placement portion non-reticulated and make only the workpiece palette 200c reticulated. Making the workpiece palette 200c reticulated reduces the amount of laser light reflection at the workpiece palette 200c, and eliminates or minimizes halation (blurring) associated with detection (imaging) of workpieces 201. The reticulated portions (that is, the bottom surface and the side surfaces) of the workpiece palette 200c are difficult to detect by the disposed-state detector 3. This eliminates or minimizes appearance of the image of the workpiece palette 200c together with the image of the workpieces 201. This, as a result, ensures accurate detection of the shapes of the workpieces 201 disposed in the workpiece palette 200c. The workpiece palette 200c corresponds to the "container" and the "storage portion" recited in the accompanying claims.

Figure 19:
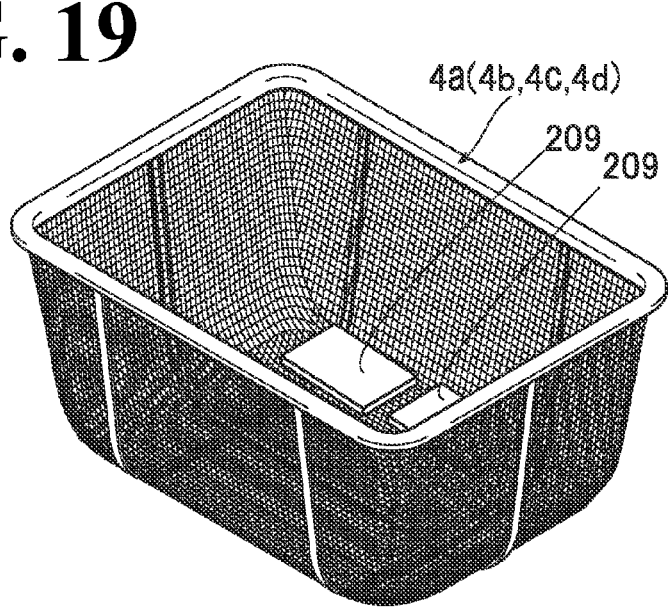
FIG. 19 illustrates workpieces in a second modification of the embodiment.

While in the above-described embodiment each workpiece has a first cylindrical portion of larger diameter and a second cylindrical portion of smaller diameter, this should not be construed in a limiting sense. For example, it is also possible to use planar workpieces 209 as shown in FIG. 19. When a temporary placement portion has a planar bottom instead of a reticulated bottom, and when the planar workpieces 209 are disposed on the planar bottom, then it may at times be difficult to recognize the boundary between the planar bottom of the temporary placement portion and each planar workpiece 209. This can make detection (recognition) of the workpieces 209 difficult. This, however, can be addressed by making the temporary placement portion reticulated, which makes the bottom of the temporary placement portion difficult to detect and facilitates detection (recognition) of the workpieces 209.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A robot system comprising:
a container configured to accommodate a plurality of to-be-held objects and comprising a reticulated portion;
a robot arm comprising a holder configured to hold a to-be-held object among the plurality of to-be-held objects;
a projector configured to project light to the container;
a disposed-state detector configured to detect reflected light of the light projected by the projector and configured to detect the disposed states of the plurality of respective to-be-held objects disposed in the container based on a detection result of the reflected light; and
a robot controller configured to control the robot arm based on the disposed states of the plurality of respective to-be-held objects detected by the disposed-state detector,
wherein the reticulated portion comprises a linear member having a thickness, and
wherein the disposed-state detector is not configured to detect an object having a thickness as small as the thickness of the linear member.

2. The robot system according to claim 1, wherein the reticulated portion is disposed on a bottom surface of the container.

3. The robot system according to claim 2, wherein the reticulated portion is disposed over the bottom surface and side surfaces of the container.

4. The robot system according to claim 3, wherein the container comprises opposed side surfaces inclined such that a distance between the opposed side surfaces increases as the opposed side surfaces extend upward from a bottom surface of the container.

5. The robot system according to claim 3, wherein the reticulated portion comprises a linear member comprising a circular cross-section.

6. The robot system according to claim 2, wherein the container comprises opposed side surfaces inclined such that a distance between the opposed side surfaces increases as the opposed side surfaces extend upward from a bottom surface of the container.

7. The robot system according to claim 2, wherein the reticulated portion comprises a linear member comprising a circular cross-section.

8. The robot system according to claim 1, wherein the container comprises opposed side surfaces inclined such that a distance between the opposed side surfaces increases as the opposed side surfaces extend upward from a bottom surface of the container.

9. The robot system according to claim 8, wherein the reticulated portion comprises a linear member comprising a circular cross-section.

10. The robot system according to claim 1, the linear member comprises a circular cross-section.

11. The robot system according to claim 1,
wherein the projector is configured to project laser light to the container, and
wherein the disposed-state detector comprises
a camera configured to pick up an image of the container, and
a distance operator configured to calculate a three-dimensional disposed states of the plurality of respective to-be-held objects disposed in the container based on the image obtained by the camera.

12. The robot system according to claim 1, wherein the disposed-state detector is disposed on the robot arm.

13. The robot system according to claim 1,
wherein the container comprises a magnetic material, and
wherein the holder of the robot arm is configured to magnetically hold the to-be-held object among the plurality of to-be-held objects disposed in the container.

14. The robot system according to claim 13,
wherein the container comprises
a reticulated temporary placement portion, and
a storage portion configured to preliminarily accommodate a plurality of to-be-held objects before the plurality of to-be-held objects are held by the holder of the robot arm, and
wherein the robot controller is configured to control the robot arm to have the holder magnetically hold a to-be-held object among the plurality of to-be-held objects disposed in the storage portion, and configured to control the robot arm to move the to-be-held object held by the holder to the reticulated temporary placement portion.

15. The robot system according to claim 1,
wherein the container comprises a storage portion configured to preliminarily accommodate a plurality of to-be-held objects before the plurality of to-be-held objects are held by the holder of the robot arm, and
wherein based on the disposed states of the plurality of respective to-be-held objects detected by the disposed-state detector, the robot controller is configured to control the holder of the robot arm to hold a to-be-held object among the plurality of to-be-held objects disposed in the storage portion.

16. A robot system comprising:
a container configured to accommodate a plurality of to-be-held objects and comprising a reticulated portion;
a robot arm comprising a holder configured to hold a to-be-held object among the plurality of to-be-held objects;
a projector configured to project light to the container;
a disposed-state detector configured to detect reflected light of the light projected by the projector and configured to detect the disposed states of the plurality of respective to-be-held objects disposed in the container based on a detection result of the reflected light; and
a robot controller configured to control the robot arm based on the disposed states of the plurality of respective to-be-held objects detected by the disposed-state detector,
wherein the container comprises a magnetic material,
wherein the holder of the robot arm is configured to magnetically hold the to-be-held object among the plurality of to-be-held objects disposed in the container,
wherein the robot controller is configured to control driving of the robot arm,
wherein the container comprises
a reticulated temporary placement portion, and
a storage portion configured to preliminarily accommodate a plurality of to-be-held objects before the plurality of to-be-held objects are held by the holder of the robot arm, and
wherein the robot controller is configured to control the robot arm to have the holder magnetically hold a to-be-held object among the plurality of to-be-held objects disposed in the storage portion, and configured to control the robot arm to move the to-be-held object held by the holder to the reticulated temporary placement portion, wherein the reticulated temporary placement portion comprises an area of space configured to accommodate a number of to-be-held objects that are in flat orientation in the area of space without overlapping of the to-be-held objects, and wherein the disposed-state detector is configured to detect the plurality of to-be-held objects disposed in the storage portion so as to move a to-be-held object among the plurality of to-be-held objects from the storage portion to the reticulated temporary placement portion, and configured to detect the to-be-held object at the reticulated temporary placement portion in more detail than when the disposed-state detector detects the plurality of to-be-held objects disposed in the storage portion.

17. The robot system according to claim 16, wherein the disposed-state detector is configured to detect an orientation of the to-be-held object at the reticulated temporary placement portion.

18. The robot system according to claim 17, further comprising a table on which to change the orientation of the to-be-held object, wherein based on the orientation of the to-be-held object in the container, the robot controller is configured to select between controlling the robot arm to place the to-be-held object onto the table and change the orientation of the to-be-held object on the table, and controlling the robot arm to transfer the to-be-held object to a next process without placing the to-be-held object onto the table.

* * * * *